(12) United States Patent
Ice et al.

(10) Patent No.: US 6,414,282 B1
(45) Date of Patent: Jul. 2, 2002

(54) ACTIVE HEATER CONTROL CIRCUIT AND METHOD USED FOR AEROSPACE PROBES

(75) Inventors: Paul A. Ice, Apple Valley; Charles R. Willcox, Eden Prairie, both of MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 09/704,158

(22) Filed: Nov. 1, 2000

(51) Int. Cl.⁷ ................................................. H05B 1/02
(52) U.S. Cl. ........................ 219/481; 219/209; 219/497; 219/505; 219/508; 340/580; 244/134 D
(58) Field of Search ................................ 219/202–205, 219/494, 497, 501, 505, 508, 483–486, 481, 209, 210; 340/580; 244/134 D

(56) References Cited

U.S. PATENT DOCUMENTS

| | | | |
|---|---|---|---|
| 2,221,547 A | 11/1940 | Kollsman | 73/212 |
| 3,535,930 A | 10/1970 | Rees | 73/212 |
| 4,121,088 A | 10/1978 | Doremus et al. | 219/201 |
| 4,458,137 A | 7/1984 | Kirkpatrick | 219/201 |
| 5,464,965 A | * 11/1995 | McGregor et al. | 219/497 |
| 5,611,952 A | * 3/1997 | Jones | 219/505 |

\* cited by examiner

*Primary Examiner*—Mark Paschall
(74) *Attorney, Agent, or Firm*—Westman, Champlin & Kelly, P.A.

(57) ABSTRACT

An active heater control circuit for a deicing heater on a probe mounted on an aircraft, such as a pitot pressure sensing probe, a pitot-static pressure sensing probe, a total air temperature sensor, or engine inlet probe, controls power to the heater through a switch. When activated the switch sends electrical power to the heater until the probe temperature reaches a desired set point. A feature of the invention is an override pulse, which independently activates the switch to provide power to the heater at a selected period and duty cycle such that the aircraft current monitoring circuit receives current sufficiently often to avoid triggering a false heater failure alarm even when the probe temperature has reached its control set point. This feature allows the use of probes incorporating active heat control on existing aircraft configured for older probes having simple nickel-based resistive heater control.

17 Claims, 4 Drawing Sheets

Full-On (very high mass flow)

Under Control (moderate mass flow)

"Off" with Override Pulses (low mass flow)

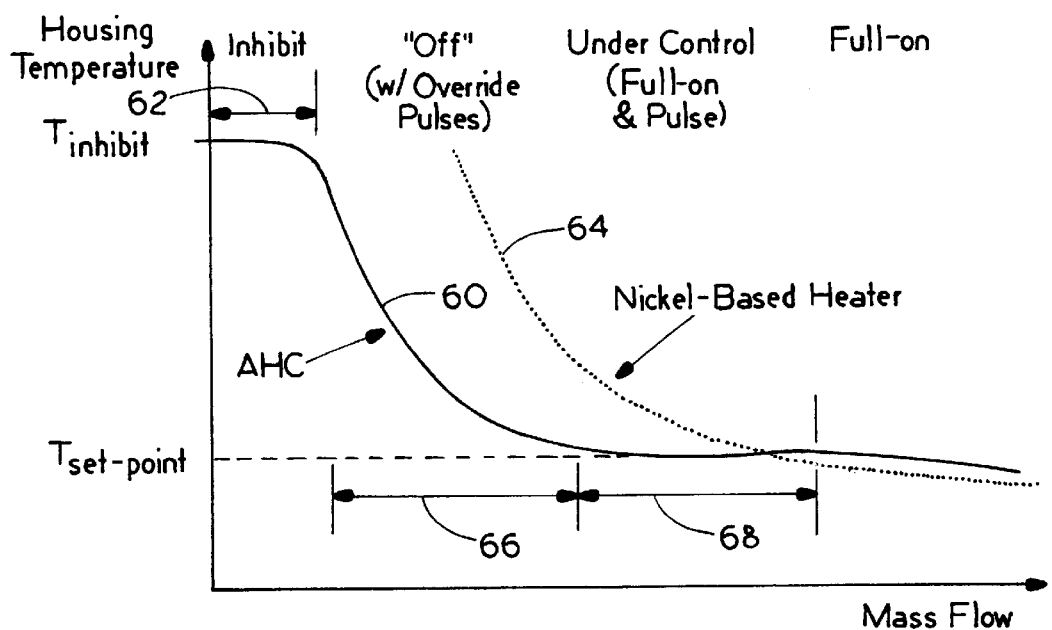
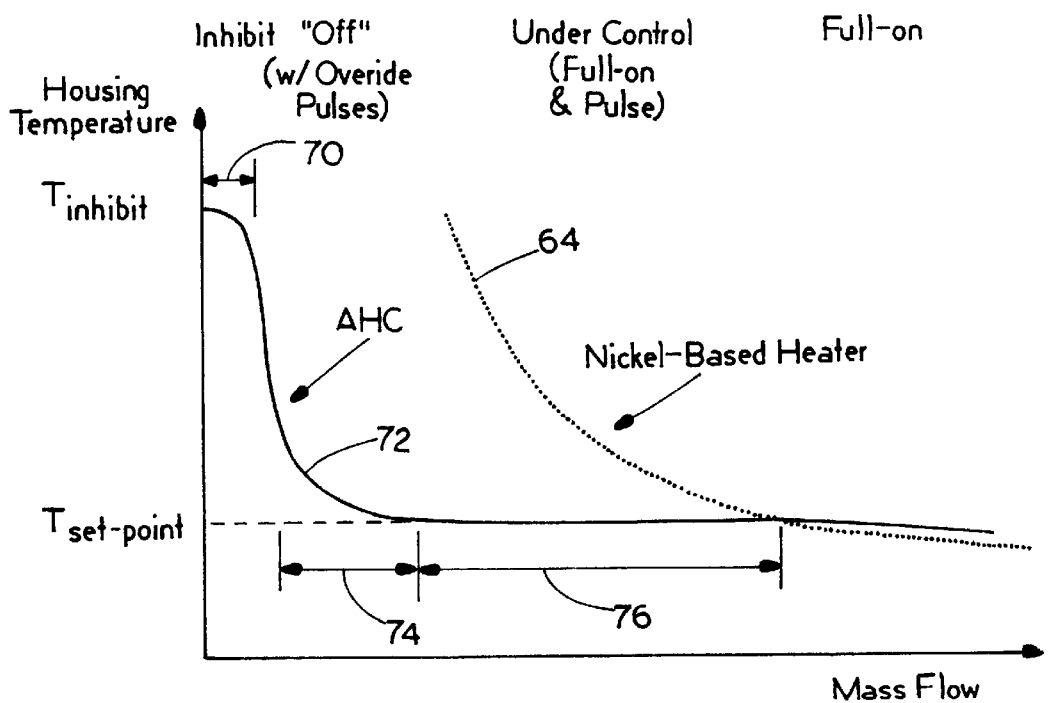

_US 6,414,282 B1_

ACTIVE HEATER CONTROL CIRCUIT AND METHOD USED FOR AEROSPACE PROBES

BACKGROUND OF THE INVENTION

The present invention relates to an active heater control that is used in connection with aerospace probes that sense environmental parameters, such as pitot or pitot-static tubes, fuselage mounted total air temperature sensors, and engine inlet air temperature sensors, which all employ heaters to keep the probes free of icing during aircraft operation. The heaters usually are on continuously in flight, and during selected periods of time on the ground. The active heater control circuit of the present invention reduces heater power during conditions of low mass air flow thereby avoiding heater or probe damage or other performance problems.

In the prior art, traditional deicing heaters on probes, such as pitot, pitot-static, total air temperature and engine inlet temperature sensor probes employ nickel-based resistors that rely on the rise in electrical resistance with temperature exhibited by nickel to reduce current load. Heaters of this type provide only rudimentary temperature control when power is applied in the form of a constant voltage because the change in resistance of nickel with temperature is not large. As a consequence, probe temperatures often become excessive when convection cooling is poor, that is, when the air mass moving over the probe is low, such as when an aircraft is on the ground, either stationary or taxiing. Excessive probe temperatures can result at that time, causing reduced reliability of the heating element. Excessive probe temperatures also cause severe thermal stresses in the sensor assembly leading to various failure modes. In the case of total air temperature probes, excessive temperatures increase errors in the total air temperature measurement, referred to as the deicing heater error or DHE.

Active heater controllers (AHCs) using semiconductor switches such as power MOSFETs, transistors, triacs, and SCRs are often utilized as switches to control power to resistive heating elements. A major impediment to the use of such active devices on aerospace probes is their incompatibility with existing aircraft systems. The problem lies with the aircraft current monitoring circuitry which expects relatively high, substantially continuous current levels typical of existing probes. An AHC will pulse the current in the form of regular on/off cycles in order to achieve temperature control. On/off cycling is desirable because it reduces power dissipation in the active device. It is preferable to have the active device, or switch, either fully "on" or "off" as opposed to an intermediate state, which forces the active device to dissipate power in order to control heater element current to a desired level.

Active temperature control is achieved by controlling the "on" and "off" periods of the active device, allowing the thermal inertia of the probe to smooth out the final probe temperature. To maintain reasonable temperature control, the "off" period often becomes too long, sometimes on the order of seconds. Aircraft current monitors presently used interpret these dormant or off periods, (i.e., when the current draw is zero), as a probe heater failure. The indication of failure is unacceptable and has prevented active heat controller usage on existing aircraft without modifying the aircraft's current monitoring circuitry, a costly and impractical task for aircraft already in service.

SUMMARY OF THE INVENTION

An active heater control according to the present invention controls a probe or sensor heater so that the time that the heater is on when there is low mass flow past the probe is short enough to avoid heater damage and other problems with thermal stresses in the probe or sensor assembly while being compatible with existing aircraft current monitoring circuitry. False signaling of unintended heater failures is avoided by providing an "off" period of the active device that is less than the time constant interval of the aircraft's current monitoring circuit.

Once the maximum "off" period of the aircraft current monitor before signaling a failure is established or known, the active heater control circuitry can be modified to generate a series of override pulses which effectively force the active switch to turn on regardless of the probe housing temperature. However, during the "off" period of the override, or in other words, at times when there is no override pulse, temperature control operations will proceed as normal. The end result is the controller will always be on for a predetermined minimum time at a rate constant enough to assure the aircraft current monitor does not signal a probe heater failure, when none has occurred.

Stated another way, the present invention provides pulses that will activate the heater on the aircraft probe at periods of time that will insure the aircraft's current monitoring circuitry will sense that the heater is functioning, without over heating the probe itself. For example, if a probe is off, for example, 4 seconds, the aircraft current monitoring circuitry would indicate that the probe heater was inoperative or had failed, and would provide a signal indicating failure. If the probe is on for a short period of time at periods less than the time for the current monitor to signal failure, that is, for example, every three seconds, the aircraft current monitor would recognize that the heater was functioning.

BRIEF DESCRIPTION OF THE DRAWINGS

FIG. 3 is a plot showing the difference between a temperature profile of a heater controlled with the automatic heater control of the present invention, and a standard nickel based heater temperature profile with a high minimum current threshold;

FIG. 4 is a plot similar to FIG. 3, using a low minimum current threshold;

DETAILED DESCRIPTION OF THE EXEMPLARY EMBODIMENTS

Figure 1:
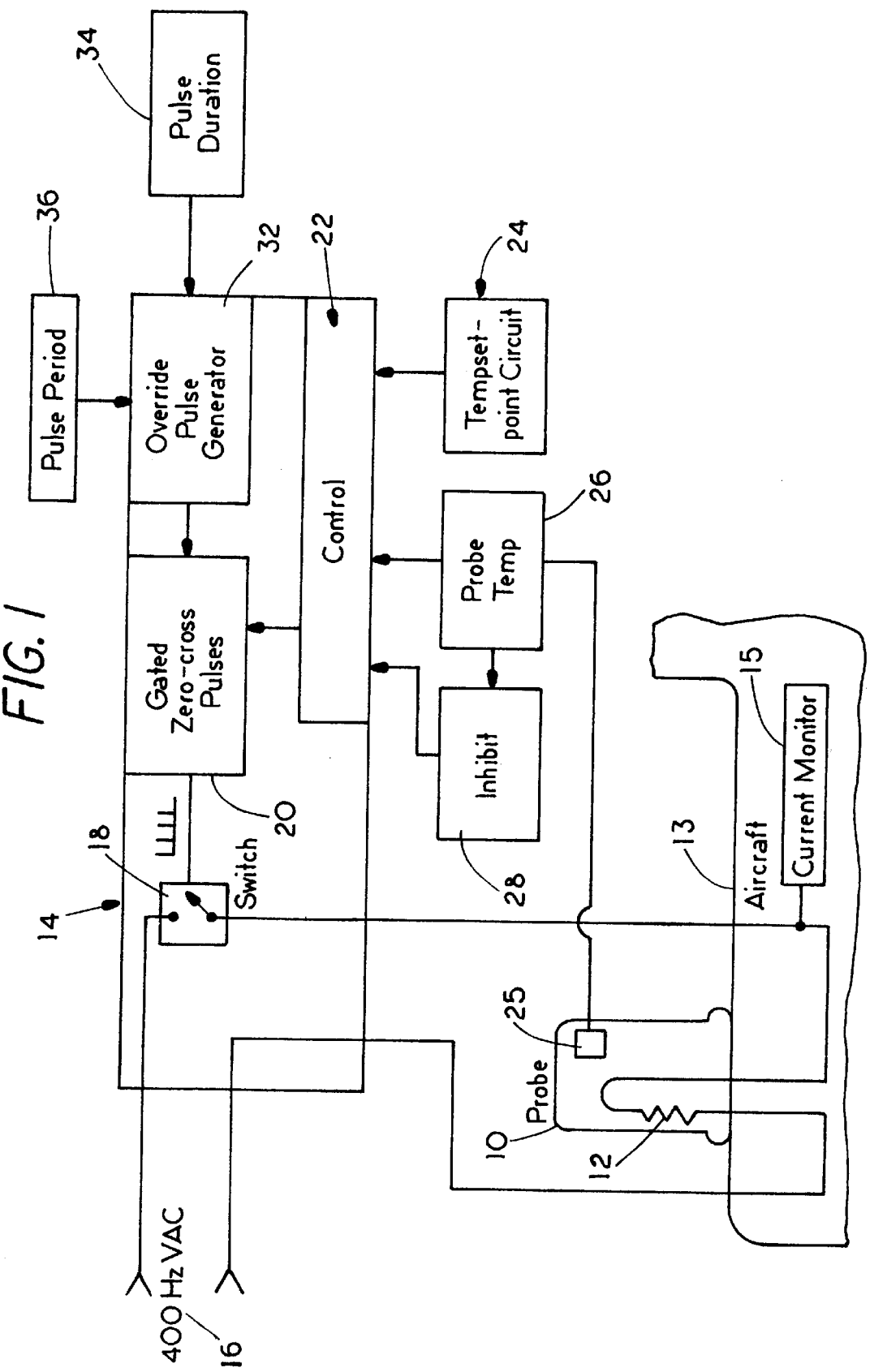
FIG. 1 is a schematic representation of a typical control circuit for a probe heater, including a heater control circuit having override pulses that control an active switch to insure powering the heater at selected minimum periods of time.

In FIG. 1, an overall block diagram representing an air data sensing probe, the control system of the present invention is illustrated. A probe 10, which can be a pitot pressure sensing probe, a pitot static pressure sensing probe, and exteriorly mounted total air temperature sensor, an engine inlet total air temperature sensor, an angle of attack probe or other sensor assembly, as desired is mounted on an aircraft represented at 13. The probe 10 is provided with a probe heater 12 that normally is a resistance type heater integrated into the probe, particularly along leading edges and other surfaces where ice accretes, so that the probe will deice in a normal manner. The probe heater 12 is controlled by an active heating control circuit 14. The heater 12 is powered by an alternating current power source 16, shown as a 400 Hz supply, and controlled by a switch circuit 18 forming part of heater control circuit 14. The switch circuit 18, can be for example, a triac, or other switching element that will supply power to the heater whenever gating pulses 20 are sent to it.

The switch circuit 18 is controlled, as represented schematically, by a central control 22 that will be responsive to a set point signal from temperature set point circuit 24 that sets a desired temperature of the probe 10. A probe temperature signal 26 represents the temperature sensed by a suitable sensor 25 on the probe 10. When the probe temperature signal 26 is equal to the temperature set signal, the control 22 will stop gate control 20 from sending gate pulses to the switch thereby preventing further heating of the probe. However, when the probe temperature 26 is less than the temperature set by the temperature set point circuit 24, the control 22 will continue to enable gate control 20 to send gating pulses to the switch circuit 18.

In addition, an inhibit temperature signal can be provided from a settable source 28 to the control 22, and if the sensed temperature at the probe, as provided by the probe temperature signal 26, exceeds the inhibit temperature, the control 22 will also shut off all power to the probe heater 12. The inhibit mode is to protect the circuit or the probe itself and is an anomalous event, invoked only if needed for safety reasons. The inhibit signal also can be used to indicate the heater is off to the aircraft current monitor 15.

A pulse generator 32 can override the control 22 and provide gated pulses to the switch circuit 18. Pulse generator 32 has an adjustable pulse duration control 34, and an adjustable pulse period control 36. The override pulse from the pulse generator 32 forces gate pulses as shown in FIG. 2C, to be sent to switch circuit 18 for a selected duration and repetition rate so as to ensure that power is sent to the probe heater at regular intervals of time. The length of time between pulses or the pulse period is selected to be less than the aircraft current monitor failure mode time period. In other words the override pulse period is less than the elapsed time set for the aircraft current monitor 15 to indicate that the heater has failed.

Figure 2A:
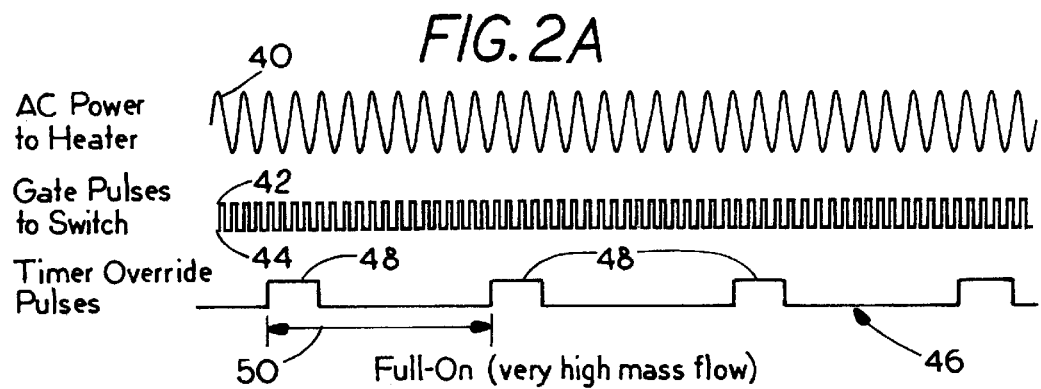
FIG. 2A is a time line set of signals showing the input power signal, a gated pulse signal, which controls the active switch, and timer override pulses during a full "on" condition, when there is high mass flow past the probe.

FIG. 2A is a graphic representation of the "full-on" mode of the active heater power control circuit 14. The illustrated power to heater 12 is indicated at 40, and is disclosed as a 400 Hz alternating current signal. The gating pulses to switch circuit 18 are shown as positive pulses 42 from a zero or base line 44. The switch circuit 18 controls power to the probe heater 12, in response to gate signals from control gate 20.

The timer override pulses from the pulse generator 32 are illustrated along the line 46, and as can be seen, there is an override pulse 48 provided at selected periods indicated by the double arrow line 50. The time period 50 is less than the time sensed by the aircraft current monitor, which would indicate that the heaters are not functioning and have failed. In the full-on mode the override pulses do not affect operation of the heater since the heater is on continuously.

Figure 2B:
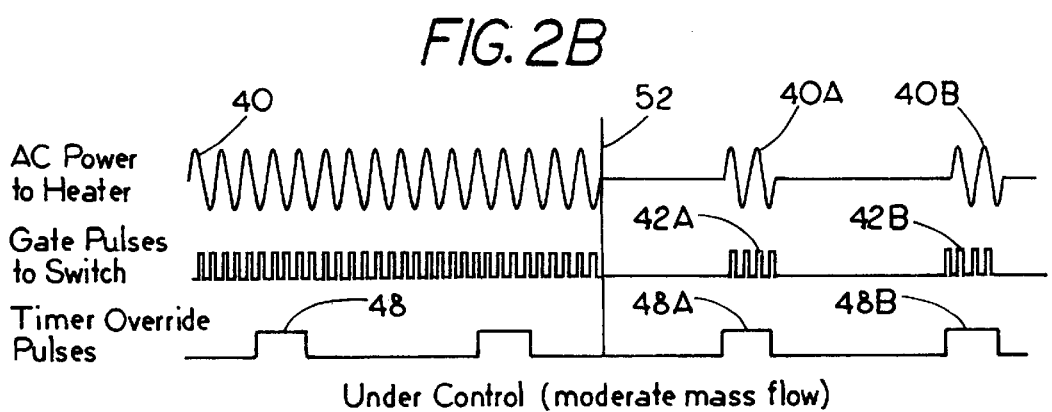
FIG. 2B is a time line representation of the same signals as in FIG. 2A when there is moderate mass flow past the probe or sensor.
Figure 2C:
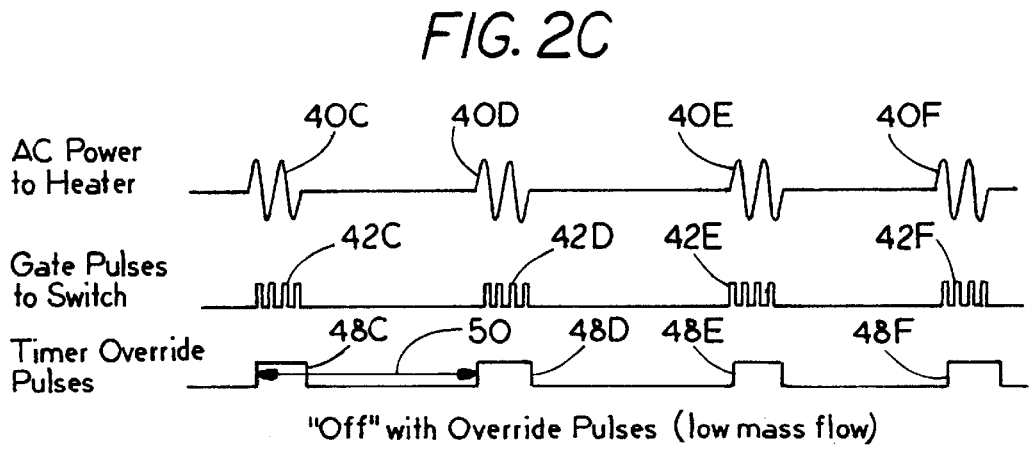
FIG. 2C is a time line representation which has the same components as FIG. 2A at a condition when there is low mass flow past the probe, and the override pulses are causing heater energization at the selected minimum periods of time.

FIG. 2B illustrates the condition where there would be an active control of the probe heater 12 during moderate mass flow. The control 22 keeps the switch circuit 18 on for a selected period of time, after which the control 22 would block pulses to the heater because the probe temperature 26 would equal the set temperature 24 for example. The control 22 would then no longer call for power to be provided to the heater. However, under such a condition, where there is a moderate mass flow, there can be instances where the power is provided to the heater by control 22 at time periods that are longer than the period indicating to the aircraft current monitor that the heater has failed. In FIG. 2B, the alternating current power to heater 12 again is indicated at 40, and the gated pulses to switch circuit 18 are indicated at 42. The timer override pulses indicated at 48 are also shown in FIG. 2B. After a time period indicated by the vertical line 52, the temperature of the probe would be at the temperature set point and control 22 would no longer indicate that pulses should be provided to switch circuit 18. Subsequent to that time, indicated by vertical line 52, when an override pulse indicated at 48A is provided from the override pulse generator 32 to the gating circuit 20, the switch circuit 18 would be turned on and pulses indicated at 42A would be provided to switch circuit 18, which passes the AC voltage 40A to the probe heater for the length of time or duration of the override pulse 48A. If the control 22 is not yet turning on the switch circuit 18, because the probe temperature still equals the probe temperature set signal 24, and the time period for the timer override pulses has expired from the last pulse, an override pulse 48B will again energize or turn on the gate circuit 20, which will provide gated pulses 42B to be provided to switch circuit 18, and hence AC power 40B to the heater 12 for the short time of the override pulse. This will indicate to the aircraft current monitor that the probe heater is still working.

If in fact the heater control shows that the temperature of the probe exceeds the set temperature, such as with a low mass flow, the condition shown at FIG. 2C will result. The control 22 would not enable the gate circuit 20 at all. However, each of the override pulses shown at 48C, 48D, 48E, and 48F would activate the gate circuit 20, sending appropriate gate pulses 42C–42F to switch circuit 18 causing the AC power as indicated by 40C–40F to be sent to the heater 12. The period of time between override pulses indicated by the line 50, again, is less than the aircraft current monitor time period that would be an indication of heater failure due to no power to the heater.

In FIG. 3, the representation of the automatic heater control of the present invention shown at plot 60, where there is a high minimum current threshold. Notice the temperature is prevented from exceeding T-inhibit during periods of low mass flow. This is represented by the T-inhibit level, where the mass flow would be in the range shown by the double arrow 62.

With the use of the override pulses only, the slope of the line 60 indicates that the temperature of the housing, which is along the vertical line, would be relatively high with very low mass flow, but the override pulses would keep the temperature of the probe lower than with a nickel-based heater shown by the plot 64.

The override pulse mode is along the segment of the base line of mass flow indicated by the double arrow 66, where control 22 would be inactive. Along the mass flow segment 68 the control 22 enables gate pulses to be sent to switch circuit 18 as shown by 40 in FIG. 2B. As the mass flow is increased to the right or the end of the double arrow 68, control 22 enables continuous gate pulses to switch circuit 18 as indicated in FIG. 2A.

In FIG. 4, the operation is shown with a lower minimum current threshold version where the inhibit signal is provided only for very low mass flows as indicated by the double arrow 70. In the override mode the housing temperature 72 would follow a steeper slope as the mass flow increased. This is indicated by a mass flow range shown by double arrow 74. Mass flows in the region shown by double arrow 76 includes some full "on" indications and some override pulse control as shown in FIG. 2B. This condition of control would be active along a greater range of mass flow than in the condition shown in FIG. 3.

Figure 5:
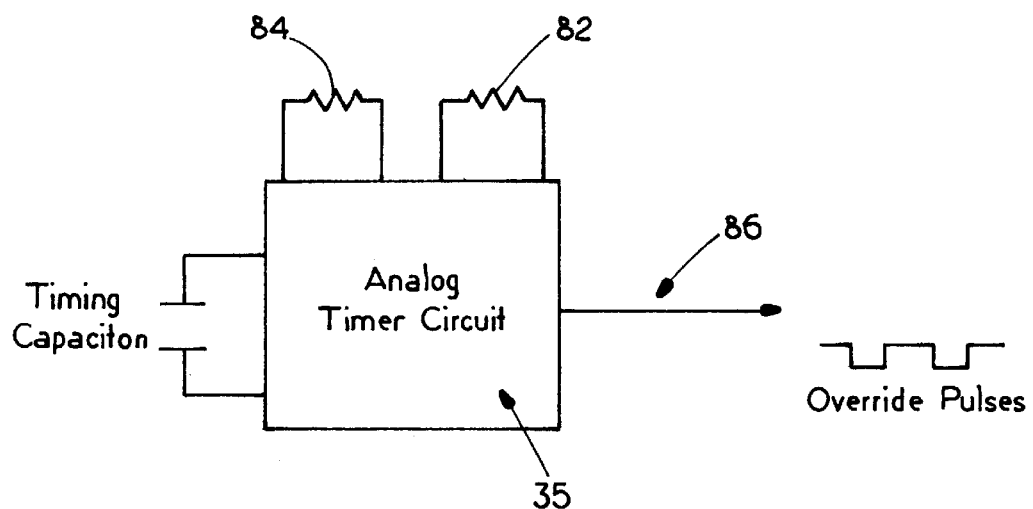
FIG. 5 is a schematic of an analog timer circuit to provide override pulses.

FIG. 5 is a block diagram representation of an analog pulse generator 32 for providing the override pulses, utilizing a resistor 82 that sets the pulse repetition rate and a resistor 84 that will set the duty cycle or the percentage of on time of the pulse. The output of the override pulses is indicated at 86.

Figure 6:
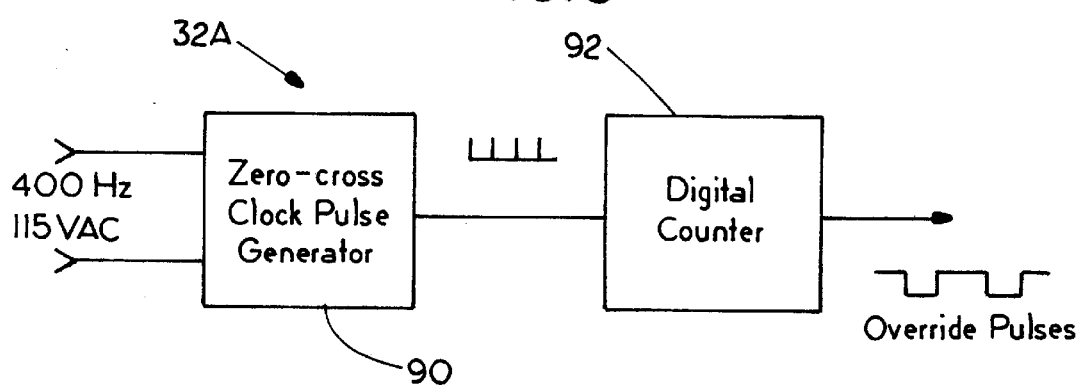
FIG. 6 is a schematic of a digital counter timer circuit, which is synchronized to the 400 HZ AC power, that can also be used to provide override impulses.

A digital version of an override pulse generator 32A, synchronized with the AC power source is shown in FIG. 6. The digital override pulse generator includes a zero cross clock pulse generator 90 that outputs pulses to a digital counter 92 which provides override pulses of a selected duration and interval, based upon the count of the clock pulses.

The effectiveness of the temperature control can be considered as a function of mass flow of air over the probe. The degree of temperature control achieved by the automatic heater control circuit with the override feature is dependant upon the aircraft current monitor characteristics and the chosen override design parameters, such as the override pulse period and duty cycle. Also, the probe housing or probe set point temperature will determine the characteristics of operation. Even though the housing set point temperature may be exceeded during low mass flow conditions using the override pulses, the temperature is still significantly lower than that found using a nickel-based heater during the intervals as illustrated at lines 66 and 74 in FIGS. 3 and 4.

Again, FIG. 3 shows operations when the intended aircraft has a current monitor having a high minimum current threshold. FIG. 4 shows the probe operating under control across a much broader range of mass flow, while the inhibit and off regions are compressed (at very low mass flows). The version shown in FIG. 4 is intended for aircraft that have a much lower minimum current threshold set on the aircraft current monitor. In either case while operating in the "under control" mode, the automatic heater control circuit, with the override pulse feature, provides a stable probe temperature near the desired housing set point temperature. Not only can the "under control" and "off" regions be adjusted by varying the override pulse duty cycle, that is, varying the override pulse cycle time "on" relative to time "off", but the temperature control set point can be changed as well. The set point temperature can be selected on an individual unit basis during manufacturing, tailored to the particular probe, such as a total air temperature sensor, to meet deicing heater error specifications. The need to meet a maximum deicing heater error is a common requirement for engine inlet temperature and total air temperature sensors.

Additional advantages of an automatic heater control circuit that will reduce the likelihood of damage from excessive temperatures include the ability to select alternative materials for aerospace sensors including unique structural materials for housings, and robust reliable heating element alloys rather than just nickel or other positive temperature coefficient material. By insuring that the sensor does not overheat, and yet that there will be no indication from the aircraft current monitors that the heater has failed, when it has not, the design areas are opened. Enhanced anti-icing and deicing performance of heated probes is also achieved through the ability to use increased power in the heaters of aerospace probes. The increased power is supplied in response to extreme flight conditions and within limits of aircraft power supply, and with the present invention, overheating at lower mass flows is avoided.

Automatic heater controls or reactive heater control circuit configurations can provide an over temperature inhibit feature, as noted schematically in FIG. 1, and also as shown in FIGS. 3 and 4, as the "inhibit mode". At very low mass flows, or in still air conditions, the housing temperature is held below some upper limit to protect either the circuit or the aircraft probe itself. Operation in the inhibit mode would be an anomalous event invoked only if needed for safety reasons.

With active heater controls, improved total air temperature sensor performance is made possible such as reduced deicing heater error, improved deicing performance, increased manufacturing yields (fewer rejects because of a reduction or elimination of deicing heater error failures), improved reliability, as well as permitting new sensor design options.

Although the present invention has been described with reference to preferred embodiments, workers skilled in the art will recognize that changes may be made in form and detail without departing from is the spirit and scope of the invention.

What is claimed is:

1. An active heater control circuit for controlling a heater for a probe on an aircraft, comprising a power control for the heater including a power source, a switch for controlling connection of the power source to the heater to provide power to the heater, a control circuit for turning on the switch, a sensor for providing a probe temperature signal to the control circuit, the control circuit turning on the switch as a function of the probe temperature signal, and an override circuit providing an override signal to the switch for providing power to the heater at selected intervals independently of the control circuit.

2. The circuit of claim 1, wherein power is provided to the heater as a series of gated power pulses through the switch, said power pulses being provided to the heater during a duty cycle of the override signal.

3. The control circuit of claim 1, wherein the heater is forming part of aircraft controls, the control circuit including a current monitor that indicates failure if power is absent from the heater for a monitored period of time, the selected interval of said override signal being at a frequency that is selected to be less than the monitored period of time.

4. The active heater control circuit of claim 1, wherein said power is provided to said heater in the form of pulses controlled by the switch, and the override signal activates the switch at desired times, and for lengths of time selected to indicate continued functioning of the heater.

5. The active heater control circuit of claim 1, wherein there is a set point circuit providing a set point signal to the control circuit, the control circuit turning on the switch only when the temperature signal is less than the set point signal.

6. In combination with a probe on an aircraft across which air flows, the probe having a heater thereon powered by electrical pulse signals, an active heater control circuit connected to said heater including a power source, a switch for controlling connection of the power source to the heater, a first control having an off state and an on state for turning on the switch when the temperature indicated by the probe is less than a set point temperature, and a second control comprising a periodic signal to turn on the switch regardless of the state of the first control.

7. The combination of claim 6, wherein the power source provides an alternating current signal, and the switch is a gate that passes the alternating current signal as a series of gated pulses in response to at least one of the first and second controls.

8. The combination of claim 6, and a circuit for providing an inhibit signal indicating a temperature above which the switch is disabled, said circuit for providing an inhibit circuit being connected to said switch to disable said switch.

9. The combination of claim 6, wherein said second control comprises a pulse generator, said pulse generator delivering a control pulse to the switch to turn on the switch and provide power to the heater at selected periods of time.

10. The combination of claim 9, wherein said pulse generator has an adjustable time period.

11. The combination of claim 9, wherein said pulse generator includes a control for changing the duration of pulses provided by the pulse generator.

12. The combination of claim 6, wherein said first control receives a set point signal indicating the desired temperature of the probe, and wherein the probe has a temperature sensor thereon to provide a probe temperature signal to the control for comparison with the set point signal to determine when the control turns the switch on.

13. The combination of claim 12, wherein said second control operates independently of the first control to turn on the switch at selected periods of time.

14. A method of controlling power to a deicing heater on an aircraft probe, comprising providing a power source, energizing the heater with the power source through a control in response to signals indicating the probe temperature is below a desired set point temperature, and providing power to the heater at selected periods of time independently of the signals indicating the probe temperature.

15. The method of claim 13, including providing the control through a switch to control power from the power source to the heater for energizing the heater and wherein providing power to the heater independently of the signals indicating the probe temperature comprises controlling the switch to provide power to the heater at selected periods of time and for selected lengths of time at each period.

16. The method of claim 13, wherein said control for controlling power to the heater comprises a switch that provides output pulses of power to the heater.

17. The method of claim 14, including providing power to the heater independently of the energizing step at intervals that are less than the time of no power which results in an indication that the heater being controlled has failed.

\* \* \* \* \*